United States Patent [19]

Davidson

[11] Patent Number: 5,755,463
[45] Date of Patent: May 26, 1998

[54] DUCT PASSING THROUGH A WALL APERTURE

[75] Inventor: Paul Davidson, Cheshire, United Kingdom

[73] Assignee: Artform International Limited, Leicestershire, United Kingdom

[21] Appl. No.: 722,252

[22] PCT Filed: Mar. 15, 1995

[86] PCT No.: PCT/GB95/00558

§ 371 Date: Nov. 19, 1996

§ 102(e) Date: Nov. 19, 1996

[87] PCT Pub. No.: WO95/27165

PCT Pub. Date: Oct. 12, 1995

[30] Foreign Application Priority Data

Mar. 30, 1994 [GB] United Kingdom ............... 9406362

[51] Int. Cl.⁶ ................................................ F16L 5/00
[52] U.S. Cl. ............................ 285/46; 285/205; 285/921
[58] Field of Search ........................... 285/46, 205, 921

[56] References Cited

U.S. PATENT DOCUMENTS

| 4,165,105 | 8/1979 | Hahn | 285/205 X |
| 4,385,777 | 5/1983 | Logsdon | 285/12 |

FOREIGN PATENT DOCUMENTS

| 3629140 | 12/1987 | Germany | 285/205 |
| 8912898 | 3/1990 | Germany . | |
| 8915213 | 3/1990 | Germany . | |
| 3940870 | 2/1991 | Germany | 285/46 |
| 4200866 | 7/1993 | Germany . | |
| 1159606 | 7/1969 | United Kingdom . | |

*Primary Examiner*—Dave W. Arola
*Attorney, Agent, or Firm*—Edwin D. Schindler

[57] ABSTRACT

A duct for extending through an aperture in a wall or partition and comprising a sleeve and outwardly extending flanges to overlie the opposed outer surfaces of the wall or partition at the opposite ends of the sleeve and at least one of the flanges being constructed to be pushed onto an end of the sleeve to lockingly engage the sleeve end.

8 Claims, 2 Drawing Sheets

DUCT PASSING THROUGH A WALL APERTURE

This invention concerns a duct adapted to extend through an aperture in a wall or partition, particularly, though by no means exclusively suitable for locating a pipe or cable passing therethrough.

Generally such pipe or cable is located in a sleeve passing through the wall and an annular cover plate surrounds the pipe or cable on each side of the wall. Conventional cover plates are often in two halves to enable them to be fitted around the pipe. They are quite loose and are essentially for cosmetic purposes and do nothing to form an effective seal between the pipe and wall surfaces.

DE-A-42WO866 discloses a duct extending through an aperture in a wall and having a sleeve provided with threaded portions. Mastic is used to provide a seal between the sleeve and the wall to prevent water entering the aperture in the wall. Flanges, which hold the mastic in place, are provided with threaded portions for engagement with respective threaded portions on the sleeve.

US-A-4385777 discloses an arrangement for covering a hole around a pipe where the pipe emerges from a wall. The arrangement includes a cover plate with an insert of flexible material to prevent propagation of noise from the pipe to the wall.

It is amongst the objects of the invention to provide an improved arrangement for locating such pipes or cables.

According to the invention there is provided a duct adapted to extend through an aperture in a wall or partition and comprising a sleeve and outwardly extending flanges adapted to overlie the opposed outer surfaces of the wall or partition at the opposite ends of the sleeve, at least one of said flanges being adapted to be pushed onto an end of the sleeve to lockingly engage same.

Both flanges may be adapted to be pushed onto the ends of the sleeve to lockingly engage same.

One of said flanges may be integrally formed with the sleeve.

The outer surface of the sleeve may be provided with axially spaced formulations which cooperate with means on the inner periphery of a flange to ensure the locking engagement.

The formations on the sleeve may comprise circumferential ribs and the means on said flange may comprise an inwardly directly circumferential tooth.

The flanges may be of generally convex form whereby their peripheral edges engage the wall or partition surfaces with their central parts engaging the sleeve being outwardly spaced from the wall or partition surfaces.

The sleeve may locate a pipe or cable passing therethrough, the flanges forming muffs therearound.

One or both flanges may be integral with other formations to enable performance of an additional function.

The central aperture of at least one flange may be closed by a mesh or grid, the entire assembly forming a substitute for an airbrick or other known venting arrangement.

The sleeve may be cut from an extended length thereof.

The invention will be further apparent from the following description, with references to the figures of the accompanying drawings, which show, by way of example only, one form of duct arrangement embodying same and for locating a pipe or cable passing through a wall.

Figure 1:
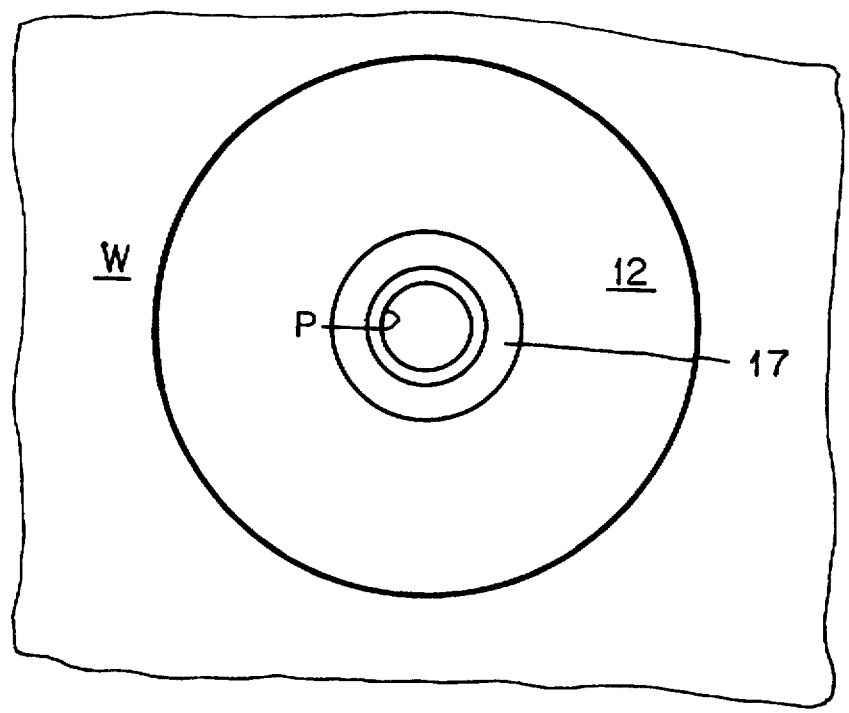
FIG. 1 shows a front elevation of the arrangement from one side of a wall.
Figure 2:
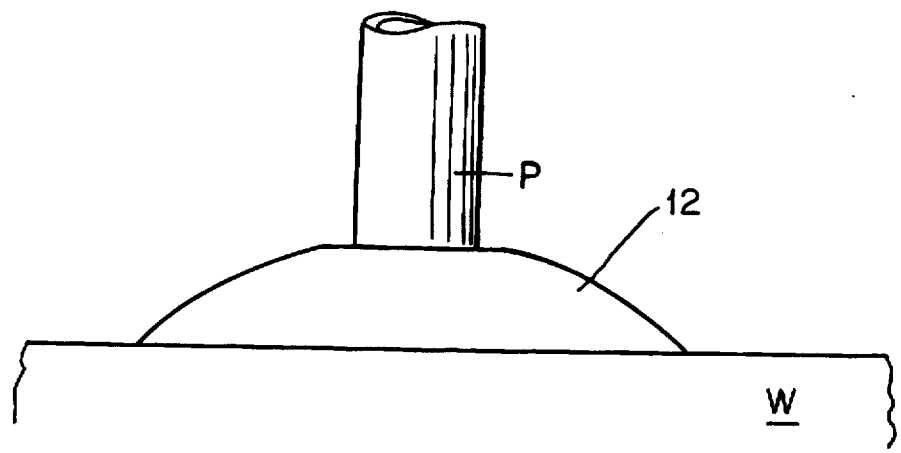
FIG. 2 shows a side elevation of the arrangement from one side of the wall.
Figure 3:
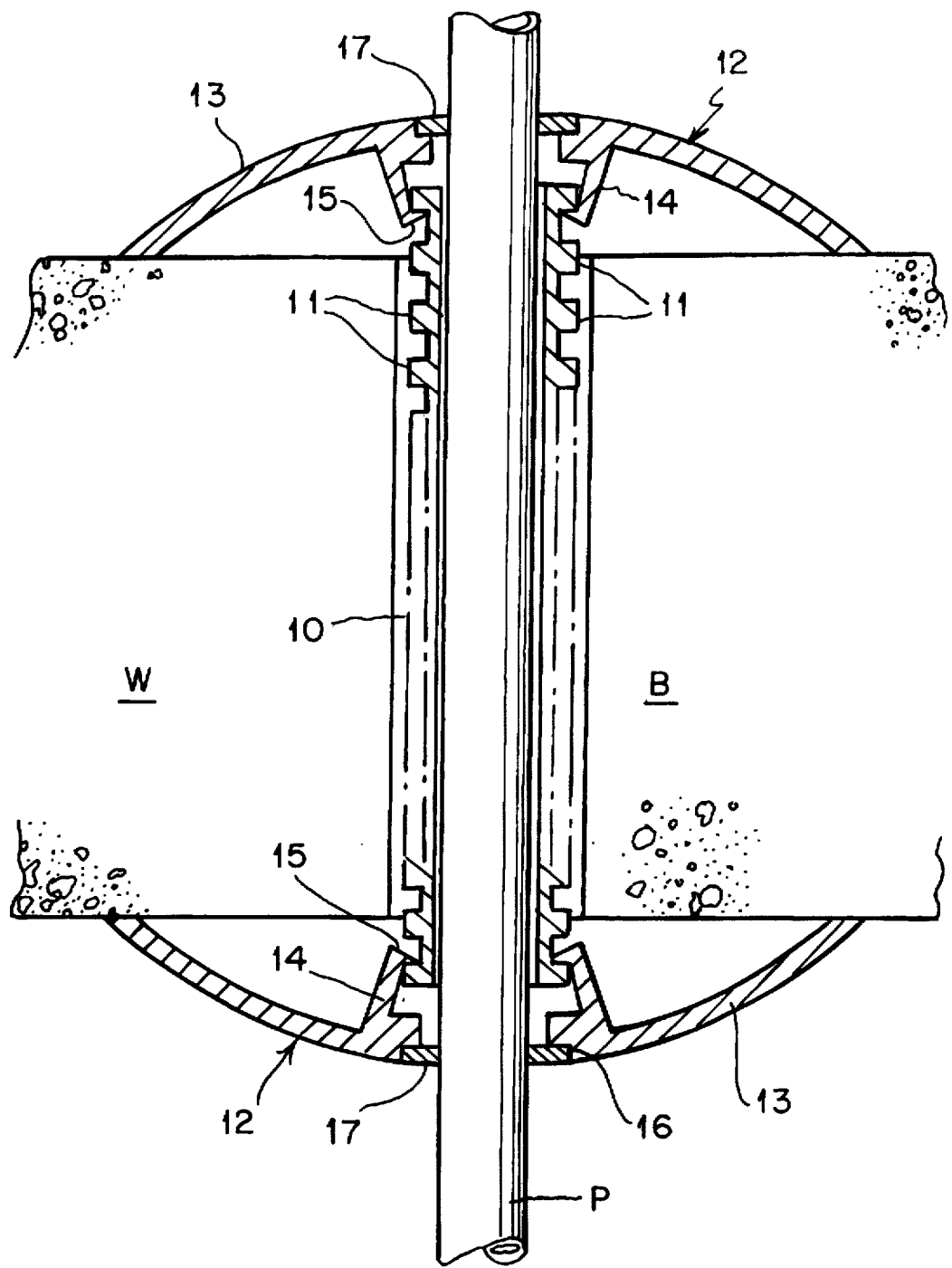
FIG. 3 shows a cross-section through the arrangement

Referring now to the drawings, it will be seen that a pipe P passes through a wall W.

The pipe P is located through a sleeve 10 which extends through a bore B in the wall W.

The sleeve which is of a plastics material is provided with axially spaced circumferential ribs 11 on its outer surface. The sleeve may be cut from an extended length thereof to suit the thickness of wall to be traversed.

Two pipe muffs 12 in the form of flanges are provided, one on each of the opposite sides of the wall W.

Each muff 12 is in the form of a domed shell 13 having an inwardly directed centrally located annular portion 14 provided with a circumferential tooth 15 on the inner surface of the annulus.

In use the muffs are located over the pipe P and pushed onto the ends of the sleeve to cause their peripheral edges to engage the wall surfaces and the teeth 15 lockingly to engage spaces between adjacent ribs 11.

One or both ends of the sleeve 10 may be tied with a knife as necessary to lie below recesses 16 formed in the outer surfaces of the muff 12 which receive and locate sealing washers or grommets 17.

The entire arrangement is sturdy, of neat appearance and forms an effective seal.

It will be appreciated that it is not intended to limit the invention to the above example only, many variations, such as might readily occur to one skilled in the art, being possible, without departing from the scope thereof, as defined by the appended claims.

Thus, for example one of the flanges may be integral with the sleeve.

The sleeve need not locate a pipe or cable it may itself save as a conduit for a fluid medium.

One or both of the flanges may be integral with other formations such as a me or grid closing the central aperture to enable the assembly of sleeve and flanges to act as a replacement for an air-brick or other vent.

The sleeve may extend outwardly from one or both of the flanges for connection to hoses or the like.

I claim:

1. A duct for extension through an aperture in a wall or partition comprising a sleeve and outwardly extending flanges for overlying an outer surface of a wall or partition at opposite ends of said sleeve, with outer surfaces of said sleeve being provided with axially spaced formations cooperable with means provided on an inner periphery of, at least, one of said flanges, thereby enabling said flange and said sleeve to be locked together as a result of a push-fit engagement therebetween.

2. A duct according to claim 1, wherein to of said flanges are provided with said locking means.

3. A duct according to claim 2 wherein the sleeve is cut from an extended length thereof.

4. A duct according to claim 1, wherein one of said flanges is integrally formed with the sleeve.

5. A duct according to claim 1, wherein the formations on the sleeve comprise circumferential ribs and the means on said flange comprises an inwardly directed circumferential tooth.

6. A duct according to claim 1, wherein the flanges are of generally convex form whereby their peripheral edges engage the wall or partition surfaces with their central parts engaging the sleeve being outwardly spaced from the wall or partition surfaces.

7. A duct according to claim 1, wherein the sleeve locates a pipe or cable passing therethrough, the flanges forming muffs therearound.

8. A duct according to claims 1, wherein the central aperture of at least one flange has extending thereacross a mesh or grid, the entire assembly forming a substitute for a venting arrangements.

* * * * *